Nov. 30, 1954   W. J. RODECK   2,695,752
LIMIT CONTROL FOR THERMOSTATS
Filed March 1, 1952   3 Sheets-Sheet 1
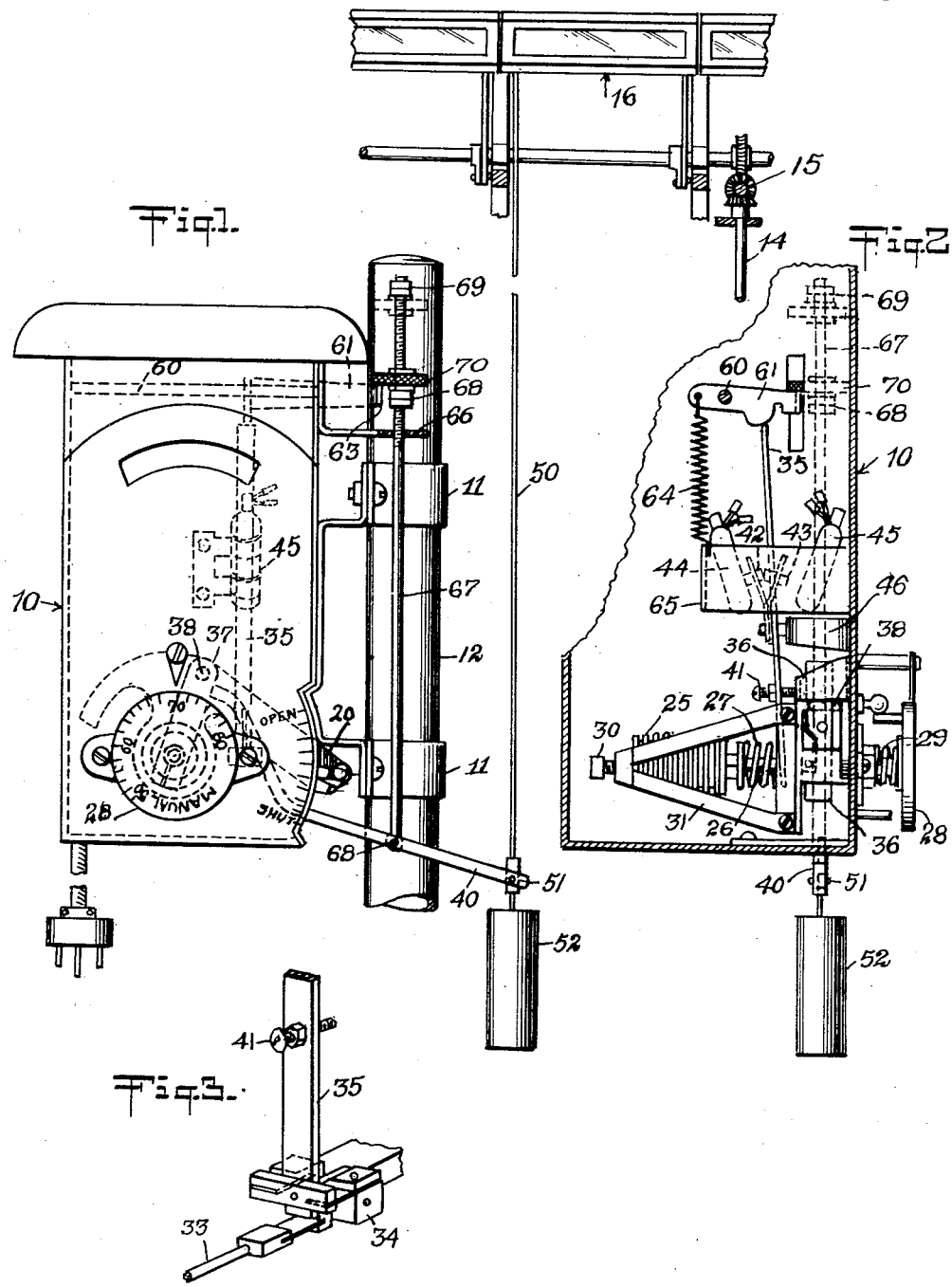
INVENTOR
Walter J. Rodeck
BY
John H. Gelaccum
ATTORNEY Nov. 30, 1954  W. J. RODECK  2,695,752
LIMIT CONTROL FOR THERMOSTATS
Filed March 1, 1952  3 Sheets-Sheet 2
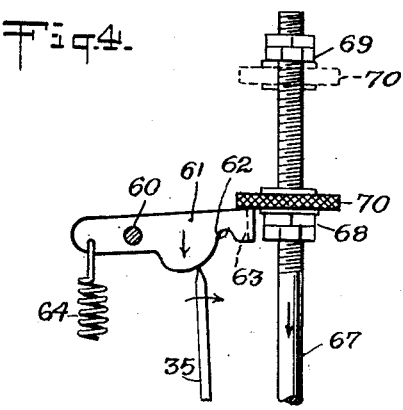
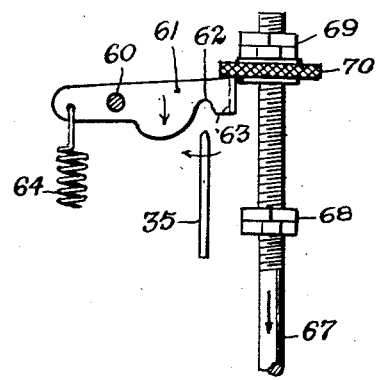
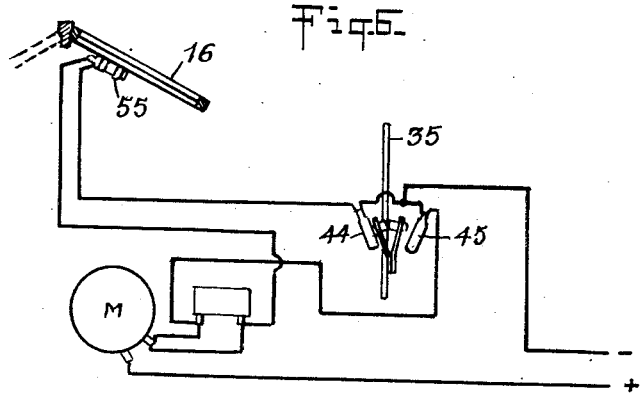
INVENTOR
Walter J. Rodeck
BY
John H. Glaccum
ATTORNEY Nov. 30, 1954
W. J. RODECK
2,695,752
LIMIT CONTROL FOR THERMOSTATS
Filed March 1, 1952
3 Sheets-Sheet 3
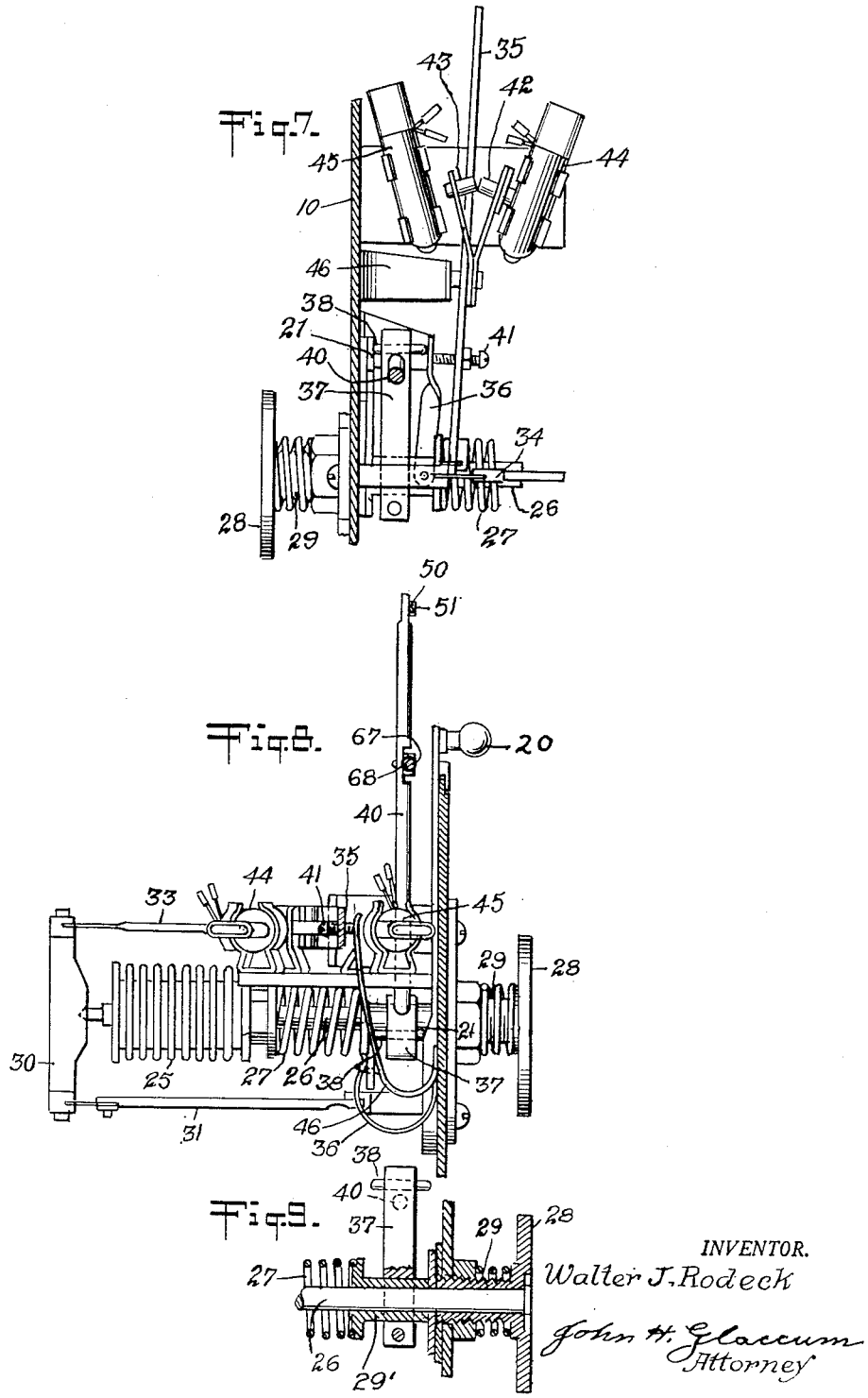
INVENTOR.
Walter J. Rodeck
John H. Glaccum
Attorney

United States Patent Office 2,695,752
Patented Nov. 30, 1954

2,695,752

LIMIT CONTROL FOR THERMOSTATS

Walter J. Rodeck, Irvington, N. Y., assignor to Lord & Burnham, Division of Burnham Corporation, Irvington-on-Hudson, N. Y., a corporation of New York Application March 1, 1952, Serial No. 274,341

2 Claims. (Cl. 236—49)

This invention relates to a control apparatus and more particularly to a limit control similar to that for thermostat control shown and described in the patent to William Barton Eddison and Thomas E. King, No. 2,519,239, issued on August 15, 1950. The Eddison and King patent describes a control which will respond to minute changes in temperature but which will avoid actuating apparatus to which it is connected to an extreme. As explained in that patent, prior controls would operate on a drop in temperature and then cause the mechanism to close all ventilators with the result that within a very short period of time the temperature would rise above that desired and the control react to open all of the ventilators. This quite obviously caused undesired fluctuation of temperature whether the device were used in a green house or similar structure. This is because there is always a time lag between the time the temperature rises and falls in one portion of the greenhouse and the time that this rise and fall reaches the thermostat.

It was one of the objects of that invention to provide a control which operated automatically through very slight changes in temperature and which provided compensating mechanism to prevent it from going to extremes. The mechanism there described also provided manual control to limit the extent to which ventilators would open.

The present invention is an improvement on the mechanism shown in the Eddison and King patent but does not change the operating principle of the device shown in that patent except that minor modifications and certain improvements have been included.

In the growing of some plants, particularly those under glass, a constant circulation of air is of more importance than temperature. In the original thermostat as invented by Eddison and King the sash would close tightly whenever the house temperature dropped sufficiently below the thermostat setting. While this would prevent a further drop in house temperature insofar as the closing of the vents could prevent the drop, it would also shut off any circulation of air through the vents until the temperature rose again above the thermostatic setting. As this might be a period of hours the plants would suffer from lack of ventilation.

An object of this improvement is to provide an adjustable closing limit in the nature of an automatic shut-off or limit switch whereby the thermostat may be set so that the sash will always close to the same predetermined position. With the limit control added the original thermostat may be set so that a drop in temperature will close the vents to a predetermined point and then prevent any further closing movement. This small opening establishes free circulation of air despite a drop in temperature below the setting of the thermostat.

Another advantage of the present improvement is that the limit control may be used so that the thermostat can be set to close completely against the header but to stop before any unnecessary strain is put on the equipment or the switch.

Briefly, the improvement makes the instrument more versatile and gives the operator a variety of settings to meet his particular circumstances.

Referring to the accompanying drawings—

Fig. 1 is a front elevation of an instrument embodying my improvement.

Fig. 2 is a side view thereof showing the thermostatic control.

Fig. 3 is a detailed view of a flexure mounting of the switch control arm.

Fig. 4 is a detailed view showing the operation of my improvement in one position.

Fig. 5 is a view similar to Fig. 4 with a different setting.

Fig. 6 is an outline of the circuit used.

Fig. 7 is a cross-sectional view taken from a direction opposite Fig. 2.

Fig. 8 is a cross-sectional top view showing the thermal mechanism.

Fig. 9 is a detailed cross-sectional view of the knob adjustment.

Referring more particularly to the drawings, the thermostat is mounted in a housing 10 which may be fastened by means of clamps 11 to an upright 12. A motor is provided to operate the shaft 14 which through suitable gearing 15 opens and closes the vents 16. The motor is controlled by the thermostat which is fully described in United States Patent No. 2,519,239.

Briefly, the control has a manually operated lever 20 which at its end has a cam surface 21 which moves with the lever. By means of this manual operation the windows can be closed entirely and the thermostat put out of use or the degree to which the windows will open can be limited as will be more fully explained.

The thermostatic elements consist of any suitable responsive element such as a metal bellows filled with methyl alchol. This element is shown at 25. It is held on a rod 6 which engages the end of the bellows and extends through a spring 27 the housing 10, the threaded sleeve 29 and the sleeve 29' into the setting knob 28. A threaded sleeve 29, also engaging the knob 28, abuts the end of a sleeve 29' abutting the spring 27 so that the turning of the knob will increase or decrease the pressure on the thermal unit 25 through the spring 27. The other end of the thermal unit 25 engages an arm 30, one end of which is fastened to the bracket 31 and at the other to a rod 33 which in turn engages the flexure tension support 34 through a series of flexures which control the forward and backward movement of the switch arm 35.

Pivotally mounted adjacent the arm 35 is a yoke 36 and between the yoke 36 and the cam 21 is a block 37 bearing a pin 38, one end of which engages the cam and the other end of which engages the yoke 36. The pin 38 is loosely mounted to slide within the block. The block 37 is mounted on the sleeve 29' and has mounted in it the modulating arm 40. It will be appreciated that upward movement of the arm 40 will move the block 37 and the pin 38 against the cam 21, thus exerting pressure on the yoke 36 which in turn through the set screw 41 will move the arm 35 rearwardly. The arm 35 carries a pair of magnets 42 and 43 adapted to control the sensitive magnet operated switches 44 and 45. The switches are of the type which cross the circuit when an external magnet is brought near the envelope of the switch and automatically open the circuit when the magnet is removed. A spring member 46 is mounted on the housing 10 and engages the arm 35 to prevent too sudden closing of the switches. The spring member 46 is shown broken away in Fig. 8 in order to avoid confusion and is shown completely in Fig. 7 and Fig. 2. The switch 44 controls the motor to close the vents while the switch 45 operates the motor to open them.

Extending from the vents 16 is a wire 50 which engages the end 51 of the modulating arm 40 and which carries a weight 52. It will be appreciated that as the vents are opened the modulating arm 40 will be moved upwardly. This will cause rotation of the block 37 with the resultant movement of the pin 38 over the cam 21 and exert pressure against the yoke 36 to back off the switch arm 35 and thus prevent an extreme operation. In the same manner, when the thermostat acts to close the vents, the weight 52 will bring the modulating arm down to prevent extreme action unless, of course, the temperature remains below the setting, when, under normal operation, the arm will continue down until the vents are in the closed position. In order to prevent undue strain and jamming of the ventilators a mercury switch 55 is provided in event the motor should not cut off in closing. This breaks the circuit.

All of the foregoing has been described in greater detail in the Eddison and King Patent No. 2,519,239.

In order to provide for positive ventilation and to prevent the ventilator from closing tightly against the header, I have provided that the arm 35 be extended beyond where the corresponding arm ended in the patent and have provided that it extend beyond the switches toward the top of the casing.

Mounted in the top of the casing is the trunnion rod 60 upon which is pivoted a cam plate 61 with a locking notch 62 and a right angular arm 63. A spring 64 fastened to the bracket 65 tends to keep the cam and the cutoff arm in the inoperative position. A bracket 66 loosely supports a rod 67, the lower end of which engages the modulating arm 40 at 68. On the upper end of the rod 67 I provide two pairs of lock-nuts 68 and 69 which are set to correspond to the extreme opening and closing position of the vents. I also provide a knurled nut 70 which is adapted to engage the arm 63 operating the cam plate 61. When the knurled nut 70 is in the upward position it will not engage the arm 63 until the vents are completely closed and will not cause the cam to operate. However, by moving the knurled nut down the rod 67 the operator can cause the cam plate 61 to engage the end of the arm 35 at any predetermined position and thus prevent its further movement rearwardly. This will keep the magnet 41 from the switch 44 and break the circuit to leave the vents open the desired amount. It will be seen that this gives a very flexible adjustment and can be used to prevent undue strain on the ventilators and equipment even though the windows are completely closed. In other words, the nut 70 may be set so that the cam plate 61 will contact the arm 35 to arrest its movement at the exact instant that the closing of the vent is completed.

A further advantage of this structure is that it is possible to lock the end of the arm 35 in the locking notch by tying the arm 63 to the backet 66. This is especially helpful in shipping the instrument since it locks the arm against movement and prevents injury to the switch members due to any possible vibration. It will be understood that the locking notch is only used in shipment and that in normal operation the end of the arm 35 only engages the lower portion of the cam surface so that it is free to move to actuate the motor to open the vents should the temperature rise to a point where additional ventilation is desired.

I claim:

1. In a control having a temperature responsive element a pair of switch members, each of said switch members controlling a circuit, a motor in said circuit operating a device to be controlled, an arm to operate either of said switch members, said arm being operatively connected to the temperature responsive element and means operated by the device to be controlled to modulate the temperature of said temperature responsive element, the improvement which consists in a limit control to positively stop the movement of said switch arm at a predetermined point comprising a cam member to engage said switch arm, an operating arm extending through the instrument case, a rod slidably mounted on the outside of said instrument, one end of said rod engaging said modulating means operated by the device to be controlled, and an adjustable nut mounted on the other end of said rod to engage said arm to operate said cam.

2. In a control having a temperature responsive element a pair of switch members, each of said switch members controlling a circuit, a motor in said circuit operating a device to be controlled, an arm to operate either of said switch members, said arm being operatively connected to the temperature responsive element and means operated by the device to be controlled to modulate the temperature of said temperature responsive element, the improvement which consists in a limit control to positively stop the movement of said switch arm at a predetermined point comprising a cam member to engage said switch arm, an operating arm extending through the instrument case, a rod slidably mounted on the outside of said instrument, one end of said rod engaging said modulating means operated by the device to be controlled, and adjustable nut mounted on the other end of said rod to engage said arm to operate said cam, said cam having means to positively lock the switch arm against movement when said arm is tied down.

References Cited in the file of this patent

UNITED STATES PATENTS

| Number | Name | Date |
|--------|------|------|
| 1,835,907 | Shiland | Dec. 8, 1931 |
| 2,067,953 | Spence | Jan. 19, 1937 |
| 2,479,243 | Larsen | Aug. 16, 1949 |
| 2,584,691 | Galeazi | Feb. 5, 1952 |